May 28, 1940. B. M. KING 2,202,346
APPARATUS FOR TESTING HARDNESS OF WATER
Filed April 17, 1939
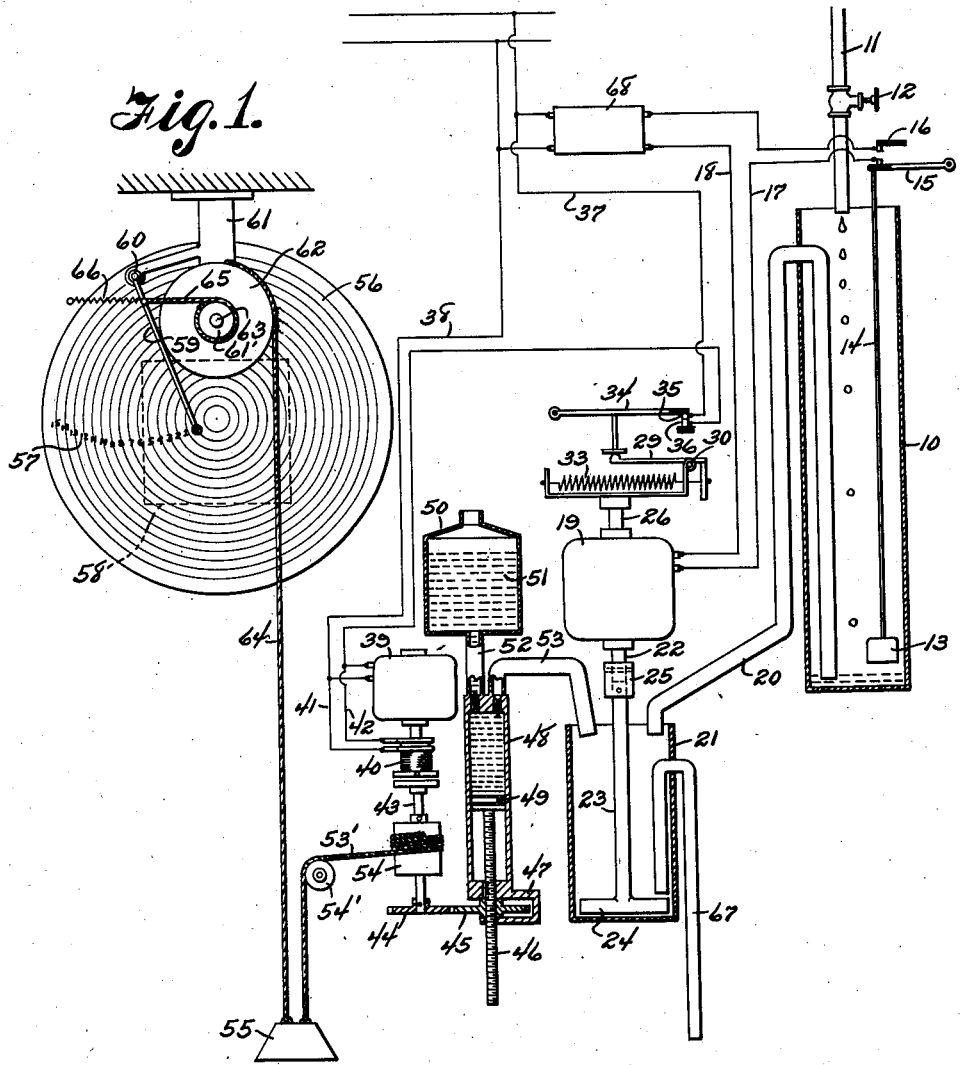
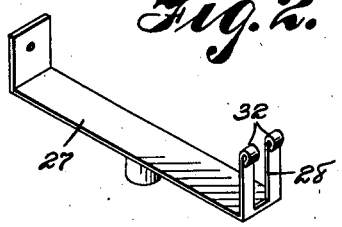

Patented May 28, 1940

2,202,346

UNITED STATES PATENT OFFICE 2,202,346

APPARATUS FOR TESTING HARDNESS OF WATER

Burdette M. King, Lancaster, Ohio

Application April 17, 1939, Serial No. 268,408

2 Claims. (Cl. 23—253)

This invention relates to apparatus for testing the hardness of water.

The method commonly in use in industrial plants and city water works, for testing the hardness of water, is to pour 58.4 cubic centimeters of water to be tested into a bottle and add a soap solution, that is, soap and alcohol, of standard mixture. The soap solution is added intermittently in small quantities and the mixture agitated each time until a lather is formed in the bottle of sufficient consistency to remain intact for five minutes. The amount of soap solution in cubic centimeters, in proportion to the known quantity of water to be tested gives the hardness of the water in grains per gallon.

In carrying out the invention apparatus has been devised which will automatically perform and record the results of testing water for hardness in grains per gallon, without involving the human element.

The essential feature of the invention is a motor having a glass impeller immersed in a beaker which contains the water to be tested and into which soap solution is gradually pumped, and wherein the speed of the motor is retarded by the friction or drag of the glass impeller in the water. As the soap solution is added to the water, a few drops at a time, there will be formed when a definite quantity is added according to the hardness of the water, a soap emulsion of the mixture which causes a noticeable reduction in the speed of the motor. A speed responsive governor connected to the motor operates a circuit closer to stop the pumping of the soap solution and deenergize a recording device which is operated simultaneously with the pumping operation.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification:

Figure 1 is a diagrammatic view of apparatus constructed in accordance with the invention.

Figure 2 is a perspective view of one member of the speed responsive switch.

Figure 3 is a perspective view of the other member of the speed responsive switch.

Referring now to the drawing in which like characters of reference designate similar parts in the various views, 10 designates a container into which the water to be tested is admitted by drops through a pipe 11 controlled by a valve 12. Mounted in the container is a float 13 having a stem 14 which is connected to a movable switch contact 15 which coacts with a stationary switch contact 16 to control a circuit through wires 17 and 18 to an electric motor 19.

A siphon pipe 20 extends from the container 10 to the top of a beaker 21 disposed below the motor. The lower end of the motor shaft 22 is coupled to the stem 23 of a disc impeller 24 through the medium of a coupling 25.

The upper end 26 of the motor shaft is equipped with a centrifugal governor comprising a substantially U-shaped base secured at the center of its bottom face to the upper end 26 of the motor shaft and provided in one of its upright legs with a slot 28. A substantially L-shaped member 29 is pivotly connected to the slotted leg of the base member through the medium of a pivot pin 30 passed through hinge eyes 31 on the long leg of the member and through hinge eyes 32 formed on the slotted leg of the base member. A helical spring 33 is connected at one end to the imperforate upright leg of the base 27 and the other end of the spring passes through the slot 28 and is connected to the short leg of the L-shaped member 29.

At a predetermined speed of the motor 19 centrifugal force will overcome the pull of the spring 33 on the short leg of the member 29 so that the latter is rocked on its pivot to move a circuit closer arm 34 into circuit closing position. The arm carries a contact 35 which coacts with a stationary contact 36 to control a circuit through wires 37 and 38 to an electric motor 39. The shaft of the motor 39 is equipped with a magnetic clutch 40 which is electrically connected in parallel with the motor through the medium of circuit wires 41 and 42.

The clutch shaft 43 terminates in a gear 44 which meshes with a gear 45 which has a thread meshing with a threaded piston rod 46 carried by a bracket 47 which is secured to the bottom of a pump cylinder 48. The piston rod is longitudinally grooved to receive a spline 9 on the bottom of the cylinder and is connected to a pump piston 49, for moving the piston longitudinally of the cylinder when the gear 45 is rotated.

A container 50 for a soap solution 51 is mounted above the pump cylinder and is connected to the top of the cylinder through the medium of a check valve controlled pipe 52. A check valve controlled outlet pipe 53 extends from the top of the pump cylinder and discharges into the beaker 21 at the top thereof.

When the motor 39 is started by closing of the motor circuit 37—38 by the centrifugal governor controlled circuit closer arm 34, the magnetic clutch 40 will be energized at the same time and rotate the shaft 43 to move the piston upwardly on its pumping stroke to force soap solution through the outlet pipe 53 into the beaker 21. When the motor 39 is deenergized the clutch 40 will also be deenergized to free the shaft 43 so that it may be rotated on its suction stroke to replenish the pump cylinder from the soap solution container 59, by mechanism which will now be described.

A drum 54 is fixed to the clutch shaft 43. One end of the cable 53' is wrapped upon the drum and the cable is trained over a guide pulley 54' and terminally secured to the weight 55. A chart 56, marked with calibrations 57 to denote hardness in grains per gallon, is actuated by a clockwork mechanism 58. A stylus 59 is pivoted, as shown at 60, on a stationary bracket arm 61 mounted adjacent to the top of the chart. A pulley 62 is mounted to idle on a pivot 63 carried by the bracket arm and a cable 64 for rotating the pulley is secured at one end to the face of the pulley and at the other end to the weight 55.

A cable 65 is secured at one end to a drum 61 integral with one face of the pulley 62 and the other end of the cable is secured to the stylus 59 near the pivot 60 thereof. A helical spring 66 is secured stationary at one end in any preferred manner and secured to the stylus to move the stylus across the calibration 57 when the weight 55 is elevated by the drum 54 during pumping stroke of the piston 49. Gravitation of the weight during the suction stroke of the piston, due to unwinding of the cable from the drum 54, pulls the cable 64 to rotate the pulley 62 and wind up the cable 65 on the drum 61 to return the stylus to its zero indicating position.

For purging the beaker of a tested quantity of water a siphon pipe 67 is connected to the beaker.

In operation water to be tested enters through the pipe 11, the hand valve 12 being adjusted so that the container 10 will not fill before the previous sample in the container 21 is tested. This is determined by the time needed to test a sample of water which has a hardness greater than any sample will be at the location of the apparatus. When water rises in the container 10, the float 13 will close the contacts 15 and 16 and start the motor 19, which will run at a free speed. This speed will lower the governor arm and close the contacts 35 and 36 to the pump motor 39 and magnetic clutch 40. In other words the speed of the motor is just fast enough to close the contacts 35 and 36. The soap solution from the pump 48 enters the container 21 a drop at a time, very slowly, and is mixed with the previous sample of water which has been trapped in the container 21. As soap solution is added there is no noticeable change in the speed of the motor which stirs this mixture. The ghost point, or a point at which a false lather appears due to natural chemicals in the test sample, is noticeable but does not reduce the speed of the motor 19 enough to break the circuit to the pump and clutch at the contacts 35 and 36.

But when the permanent lather is reached, a marked reduction in speed of the motor is produced which permanently breaks the circuit to the pump 48 and clutch 40. This circuit is held open by the lather formed which reduces the speed of the mixing motor, while the container 10 fills up to the siphon 20. Water should be near the siphon 20 because it has been filling while the test was made. When the siphon 20 operates, the addition of water to the container 21 will destroy the permanent lather, but the added water will keep the motor running slowly enough to keep the circuit of the pump and clutch open. When the container 21 fills, the siphon 67 will operate but will not siphon water from the container 21 as fast as water enters from the siphon 20. Thus some water will overflow the container 21 and be caught in a drain under it. Due to the container 10 being larger than the container 21 and the mixing motor still running, a good purge of the sample already tested in the container 21 will result. When the water in the container 10 lowers to the level of the float 13, the contacts 15 and 16 of the circuit to the mixing motor 19 will be broken and the motor will come to rest. After the siphon 20 has drawn air at the bottom of the container 10, the siphon 67 will level off the sample of water to be tested in the container 21. After this has taken place, water will be rising in the container 10 to the point where the float 13 will rise and close the contacts 15 and 16 so that the mixing motor will run fast enough to lower the governor arm and complete the circuit to the pump motor 39 and magnetic clutch 40 at the contacts 35 and 36. Thus soap solution will be fed to the new sample and the container 10 will be filling to purge the next sample.

The stirring motor 19 is preferably a fractional H. P. induction non-synchronous type with a speed of 3000 R. P. M. Therefore, the agitation is very great. There are no brushes and the bearings run in oil, therefore, the speed to operate the sensitive governor is reproduced the same each cycle because there is practically no motor friction and the drag of the solution is the same for each test. The reason for the float 13 being placed so near the bottom of the container 10 is to shorten the time that the motor 19 is stopped. In other words the float 13 stops the impeller 24 so the test sample will level off before the siphon 67 draws air. The siphon 67 is placed near the bottom of the container 21 so that only a small sample is trapped and this reduces the quantity of soap solution used to test with. A small test sample will have as much retarding effect on the impeller as a large sample.

There is no noticeable change in the speed of the mixing motor while the soap solution is being added to the water sample except at the ghost point and at the permanent lather point. The central part of the impeller 24 is not submerged when the liquid is in rotating motion due to the centrifugal changes of the liquid. As the permanent lather appears the liquid being stirred will slow up in velocity and foam over the impeller and even change the noise of the mixing motor. When this permanent lather is formed, there is a marked decrease in the speed of the stirring motor.

I have discovered that the small soap bubbles formed retard the revolving action of the mixture which sets up more resistance to the revolving impeller and the forming of these air bubbles is, I believe, caused by the surface tension of the soap film around them. One proof is that the addition of a very small particle of salt to the permanent lather formed will destroy this lather and let the impeller speed up and yet the other physical properties of this solution remain practically the same.

From the above description it is thought that the construction and operation of the invention will be fully understood without further explanation.

What is claimed is:

1. In apparatus for testing the hardness of water, a container, means for supplying a measured quantity of water to be tested to the container, a receptacle for soap solution, a pump connected to the receptacle adapted to gradually add soap solution to the water in the container, an electric motor, a speed responsive centrifugal switch connected to the motor and adapted to be moved to closed circuit position at a predetermined speed of the motor, an electric motor connected in circuit with said switch and connected to the pump for actuating the pump when the switch is closed, a recording device calibrated to denote hardness in grains per gallon connected to the second named motor for actuation thereby simultaneously with the actuations of the pump, and an impeller in the container connected to the first named motor and responsive to increasing concentration of soap emulsion in the container to produce a drag upon and slow up the speed of the first named motor to permit the centrifugal switch to move to open circuit position and stop the pump when a predetermined lather consistency occurs in the soap emulsion in the container.

2. In apparatus for testing the hardness of water, a water supply container, means for continuously supplying water in minute quantities to the container, a siphon pipe for siphoning off the water when it reaches a predetermined height in the container, a testing container supplied with water to be tested by said siphon pipe, a receptacle for soap solution, a pump connected to the receptacle adapted to gradually add soap solution to the water in the container, an electric motor, a speed responsive centrifugal switch connected to the motor and adapted to be moved to closed circuit position at a predetermined speed of the motor, an electric motor connected in circuit with said switch and connected to the pump for actuating the pump when the switch is closed, a recording device calibrated to denote hardness in grains per gallon connected to the second named motor for actuation thereby simultaneously with the actuations of the pump, an impeller in the testing container connected to the first named motor and responsive to increasing concentration of soap emulsion in the testing container to produce a drag upon and slow up the speed of the first named motor to permit the centrifugal switch to move to open circuit position and stop the pump when a predetermined lather consistency occurs in the soap emulsion in the testing container, and a siphon pipe for siphoning tested water from the testing container.

BURDETTE M. KING.